(12) United States Patent
Amtmann et al.

(10) Patent No.: US 7,907,897 B2
(45) Date of Patent: Mar. 15, 2011

(54) DATA CARRIER WITH MODIFICATION MEANS FOR MODIFYING THE LOAD PERIOD

(75) Inventors: Franz Amtmann, Graz (AT); Peter Raggam, St. Stefan im Rosental (AT); Michael Rauber, Passail (AT)

(73) Assignee: NXP B.V., Eindhoven (NL)

( * ) Notice: Subject to any disclaimer, the term of this patent is extended or adjusted under 35 U.S.C. 154(b) by 1158 days.

(21) Appl. No.: 10/562,102

(22) PCT Filed: Jun. 22, 2004

(86) PCT No.: PCT/IB2004/050966
§ 371 (c)(1),
(2), (4) Date: Dec. 22, 2005

(87) PCT Pub. No.: WO2004/114205
PCT Pub. Date: Dec. 29, 2004

(65) Prior Publication Data
US 2007/0149161 A1    Jun. 28, 2007

(30) Foreign Application Priority Data

Jun. 25, 2003    (EP) .................................. 03101886

(51) Int. Cl.
    *H04B 7/00*    (2006.01)
(52) U.S. Cl. ...................... 455/41.2; 340/10.1; 340/10.3
(58) Field of Classification Search ...................... None
    See application file for complete search history.

(56) References Cited

U.S. PATENT DOCUMENTS 6,462,647 B1 * 10/2002 Roz .............................. 340/10.1
7,283,810 B1 * 10/2007 Arakawa et al. ........... 455/414.1

FOREIGN PATENT DOCUMENTS

EP          0 699 591 B    12/1999

* cited by examiner

*Primary Examiner* — Zhiyu Lu

(57) ABSTRACT

In a data carrier (1), there are provided modification means (19) for modifying, as a function of the distance between the data carrier (1) and the base station (4), the ratio of the duration of a load period (TB) to the duration of an off-load period (TE), at which ratio the data carrier (1) load-modulates the electromagnetic field (HF) generated by a base station (4).

11 Claims, 3 Drawing Sheets

DATA CARRIER WITH MODIFICATION MEANS FOR MODIFYING THE LOAD PERIOD

The invention relates to a data carrier for contactless communication with a base station by means of an electromagnetic field generated by the base station, having an antenna coil connected to a first coil terminal and to a second coil terminal, in which antenna coil an antenna signal can be induced in operation by the electromagnetic field, and having modulation means for modulating the electromagnetic field, during successive load periods and off-load periods, with transmission data to be communicated to the base station, the electromagnetic field being load-modulated during the load periods by modifying the value of the impedance of a modulation load that is connected at least indirectly to the first coil terminal and the second coil terminal.

The invention further relates to an integrated circuit of a data carrier for contactless communication with a base station by means of an electromagnetic field generated by the base station, having a first coil terminal and a second coil terminal, to which an antenna coil can be connected, in which antenna coil an antenna signal can be induced in operation by the electromagnetic field, and having modulation means for modulating the electromagnetic field, during successive load periods and off-load periods, with transmission data to be communicated to the base station, the electromagnetic field being load-modulated during the load periods by modifying the value of the impedance of a modulation load that is connected at least indirectly to the first coil terminal and the second coil terminal.

The invention further relates to a method of modulation for the modulation, by a data carrier, of an electromagnetic field generated by a base station, wherein the following steps are carried out:

modulation of the electromagnetic field by the data carrier, during successive load periods and off-load periods, with transmission data to be communicated to the base station, the electromagnetic field being load-modulated during the load periods by modifying the value of the impedance of a modulation load belonging to the data carrier.

A data carrier of this kind, an integrated circuit of this kind and a method of modulation of this kind are known from document EP 0 669 591 B. This document discloses a data carrier that is designed for contactless communication with a base station. Data carriers of this kind are contained, for example, in so-called smart cards and are designed to communicate transmission data to the base station by means of an electromagnetic field of, for example, 13.56 MHz that is emitted from the base station. The known data carrier has an antenna coil, connected to a first and a second coil terminal, for receiving the electromagnetic field and for emitting a coil voltage arising in the antenna coil as an antenna signal for the data carrier. To modulate the electromagnetic field, the known data carrier has modulation means that load the electromagnetic field with a modulation load during the duration of a load period and that unload it again during the duration of a succeeding off-load period.

The base station has an antenna coil for receiving the load-modulated electromagnetic field and for emitting a coil voltage that arises in the antenna coil as an antenna signal in the base station. During the load period, the envelope of the antenna signal falls to a load voltage and during the off-load period it rises again to an off-load voltage. This rise and fall in the envelope of the antenna signal in the base station is analyzed in the base station to allow the transmission data to be received (amplitude or phase modulation).

It has been found that the distance of the data carrier from the base station has an effect on the speed of the rise and fall of the envelope of the antenna signal in the base station during the load period and off-load period. The known data carrier does not make any allowance for this effect, for which reason the base station is not able to determine the transmission data to optimum effect by analyzing the antenna signal.

It is an object of the invention to provide a data carrier of the kind specified in the first paragraph, an integrated circuit of the kind specified in the second paragraph, and a method of modulation of the kind specified in the third paragraph, in which the disadvantages detailed above are avoided. To achieve the object specified above, a data carrier of the above kind has the following further features:

detection means for detecting an item of energy-information that characterizes the energy contact of the antenna signal, and comparator means for comparing the item of energy information detected with a preset item of energy information and for emitting an item of comparison information, and modification means for modifying the ratio of the duration of the load period to the duration of the succeeding off-load period as a function of the item of comparison information.

To achieve the object specified above, an integrated circuit of the above kind has the following further features:

detection means for detecting an item of energy information that characterizes the energy content of the antenna signal, and comparator means for comparing the item of energy information detected with a preset item of energy information and for emitting an item of comparison information, and modification means for modifying the ratio of the duration of the load period to the duration of the succeeding off-load period as a function of the item of comparison information.

To achieve the object specified above, the following further method steps are provided in a method of modulation of the above kind:

determination of the distance between the data carrier and the base station, adjustment of the ratio of the duration of the load period to the duration of the succeeding off-load period as a function of the distance determined between the data carrier and the base station.

What is achieved by the features according to the invention is that the ratio of the duration of the load period to the duration of the off-load period is modified in the data carrier in line with the distance to the base station in such a way that the base station is able to analyze the antenna signal in the base station to optimum effect. If, for example, the data carrier is positioned relatively far away from the base station, then the case occurs that the envelope of the antenna signal in the base station falls relatively quickly to the load voltage as from the beginning of the load period, but rises again only relatively slowly as from the beginning of the off-load period. If in this case the off-load period is too short for the envelope of the antenna signal in the base station to rise from the load voltage to the off-load voltage within the full length of the off-load period, then the transmission data cannot be analyzed reliably in the base station. When this is the case, the modification means according to the invention make the ratio of the duration of the load period to the duration of the off-load period smaller by lengthening the duration of the off-load period, as a result of which the analysis of the envelope of the antenna signal in the base station to allow the transmission data to be determined can be substantially improved.

Something that is particularly advantageous in this case is that the modification means provided in the data carrier adjust the data carrier to the distance at which the data carrier is situated from the base station to make it possible for the transmission data to be received optimally in the base station. An adjustment in the base station can take place, but it does not have to.

By the provisions dealt with in claims 4, 10 and 16, the advantage is obtained that the modulation means of the data carrier perform a subcarrier modulation and the modification means are designed to modify the mark-to-space ratio of the subcarrier signal. In this way, the sum of the duration of the load period and the duration of the off-load period can be kept constant for encoding the transmission data and the adjustment of the data carrier to the distance from the base station is performed solely by modifying the mark-to-space ratio of the subcarrier signal.

By the provisions dealt with in claims 5, 6, 11 and 12, it becomes possible for detection means for determining the energy content of the antenna signal to be implemented in a reliable way.

These and other aspects of the invention are apparent from and will be elucidated with reference to the embodiments described hereinafter, though it is not to be considered as limited to these.

Figure 1:
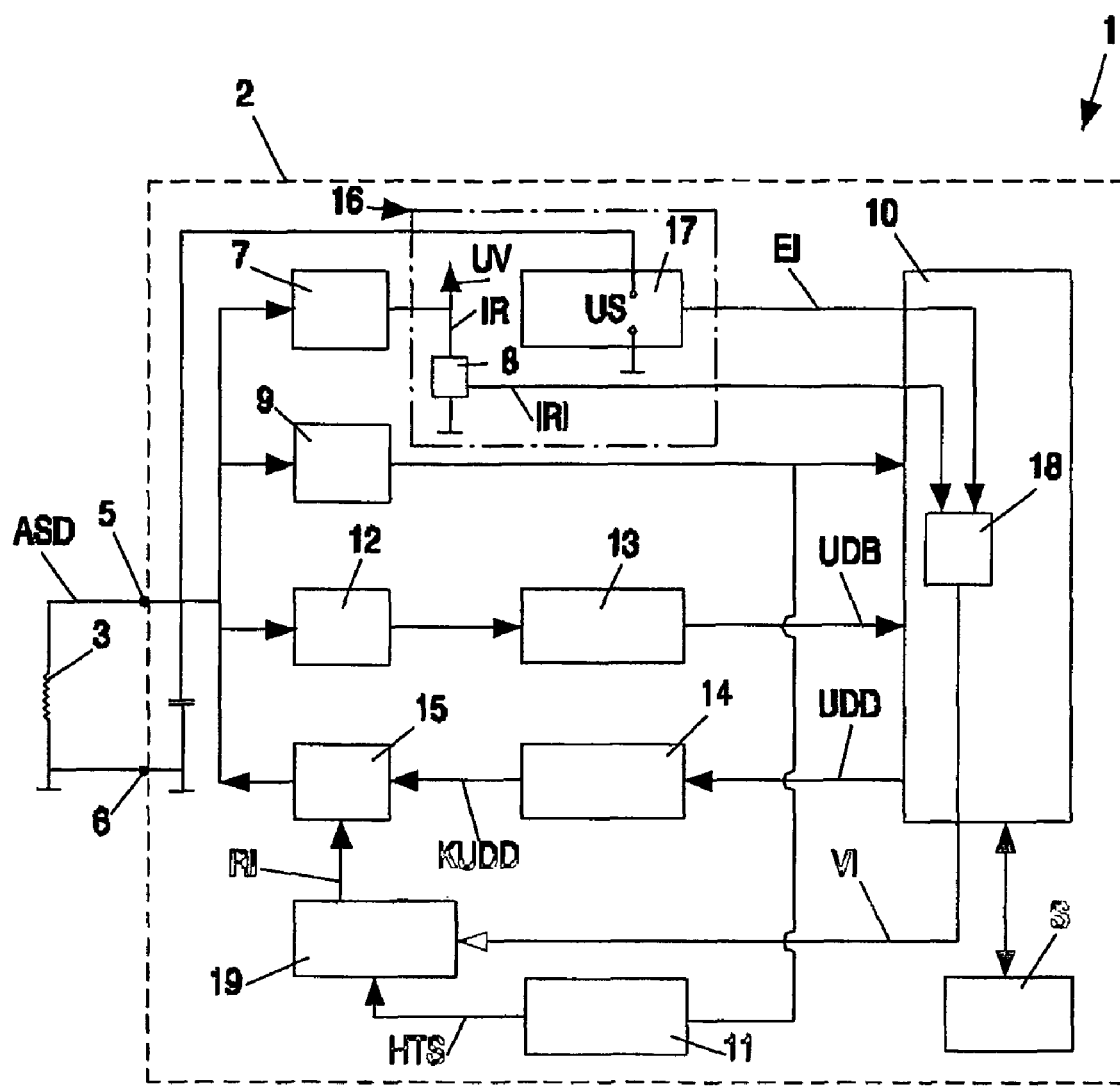
FIG. 1 shows a data carrier having modification means, for contactless communication with a base station.
Figure 1:
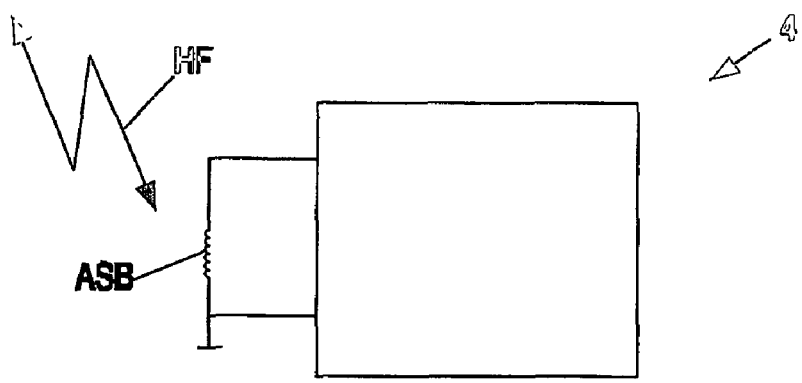

FIG. 1 shows a data carrier 1 that is formed by an integrated circuit 2 and an antenna coil 3 and that is designed for contactless communication with a base station 4 by means of an electromagnetic field HF that is generated by the base station 4. The antenna coil 3 is connected to a first coil terminal 5 and a second terminal 6 of the integrated circuit 2, an antenna signal ASD being induced in the antenna coil 3 of the data carrier 1 in operation and an antenna signal ASB in the antenna coil of the base station 4.

The antenna signal ASD can be fed to supply voltage means 7 of the data carrier 1, which rectify the antenna signal ASD and emit a supply voltage UV for all the other means and stages of the data carrier 1. The supply voltage UV is limited by a regulator stage 8 that bleeds off a parallel regulator current IR if the distance from the data carrier 1 to the base station 4 is relatively short and if the energy content of the antenna signal ASD induced in the antenna coil 3 is too high for the data carrier 1. The regulator stage 8 is designed to emit an item of regulator-current information IRI that is a function of the size of the parallel regulator current IR and thus characterizes the distance at which the data carrier 1 is situated from the base station 4.

The antenna signal ASD can also be fed to clock-signal generating means 9 of the data carrier, which derive from the clock frequency of the antenna signal ASD a clock signal for the data carrier 1 and transmit it to processor means 10 and subcarrier generating means 11 of the data carrier 1.

The antenna signal ASD can also be fed to a demodulator 12 of the data carrier 1, which demodulates the transmission data UDB contained in the antenna signal ASD that is being transmitted from the base station 4 to the data carrier 1. In this connection, the man skilled in the art will be familiar with a large number of types of modulation and demodulation and this question will therefore not be considered in detail here. The antenna signal demodulated by the demodulator 12 can be fed to decoding means 13 of the data carrier 1. In this connection, the man skilled in the art will be familiar with a large number of types of encoding and decoding and this question will therefore not be considered in detail here. The transmission data UDB determined by the decoding means 13 can be transmitted to the processor means 10. The processor means 10 are designed to process the received transmission data UDB and to store the received or processed transmission data UDB in storage means S.

Figure 2:
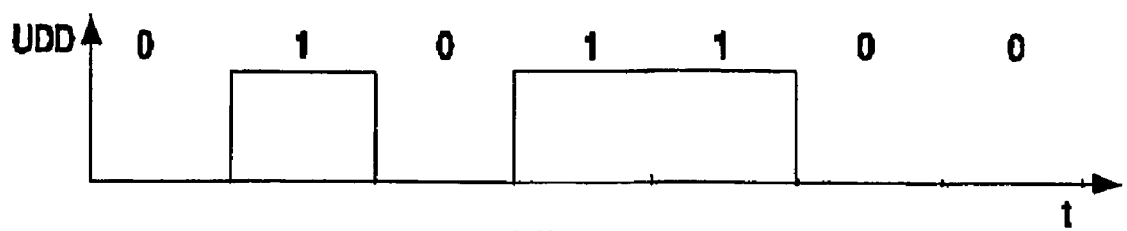
FIG. 2 shows the waveform over time of transmission data that is transmitted from the data carrier to the base station.
Figure 3:
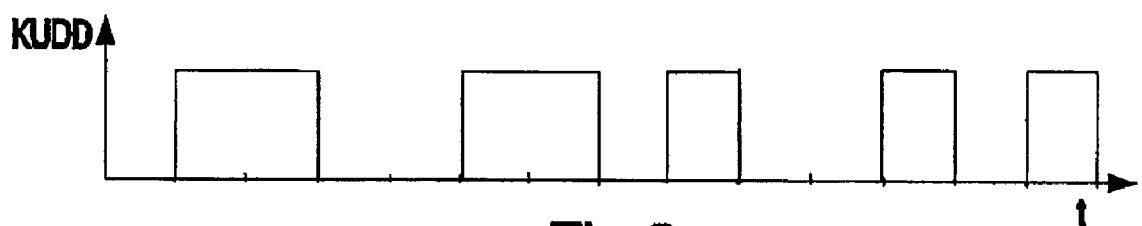
FIG. 3 shows the waveform over time of the transmission data when coded by the Manchester coding method.

If transmission data UDD is to be transmitted from the data carrier 1 to the base station 4, then the transmission data UDD can be transmitted by the processor means 10 to encoding means 14. Transmission data UDD of this kind is shown in FIG. 2 in the form of a bit sequence "0101100" and the corresponding voltage waveform over time. The encoding means 14 are designed to encode the transmission data UDD by the Manchester encoding method and they transmit encoded transmission data KUDD to a demodulator 15 of the data carrier 1. Encoded transmission data KUDD is shown in FIG. 3.

The modulator 15 is designed to modulate the electromagnetic field HF during successive load periods TB and off-load periods TE with encoded transmission data KUDD that is to be communicated to the base station 4, the electromagnetic field HF being load modulated during the load periods TB by a modification in the value of the impedance of a modulation load that is connected at least indirectly to the first coil terminal 5 and the second coil terminal 6. For this purpose, the modulator first performs a subcarrier modulation of the encoded transmission data KUDD with a subcarrier signal HTS that is emitted by the subcarrier generating means 11. A subcarrier-modulated transmission signal of this kind HUS is shown in FIG. 4.

To continue the sequence, the modulator 15 is designed to connect an impedance between the first coil terminal 5 and the second coil terminal 6 during high periods of the subcarrier-modulated transmission signal HUS (load periods TB) and in so doing to load the electromagnetic field HF with this impedance and thus to perform load modulation. During low periods of the subcarrier-modulated transmission signal HUS (off-load periods TB), the impedance is switched away from the first antenna terminal 5 and in this way the load is removed from the electromagnetic field HF, as a result of which the electromagnetic field HF is load-modulated. The antenna signal ASB that is induced in the antenna coil of the base station 4 by the load-modulated electromagnetic field HF is shown in FIG. 5.

Figure 4:
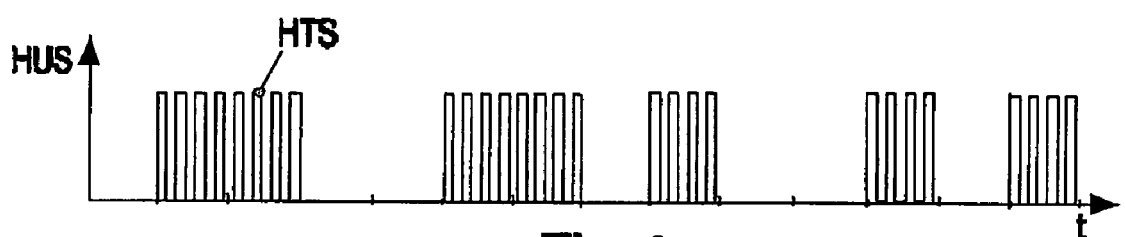
FIG. 4 shows the waveform over time of a subcarrier-modulated transmission signal that arises in the data carrier.
Figure 5:
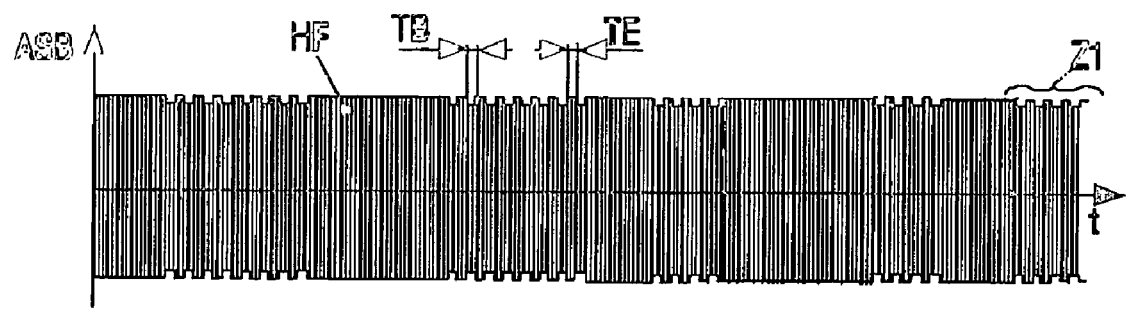
FIG. 5 shows the waveform over time of the electromagnetic field that, having been load-modulated with the signal shown in FIG. 4, is induced in the antenna coil of the base station, an idealized signal waveform having been assumed.

The signal waveforms shown in FIGS. 4 and 5 are idealized signal waveforms that in practice are modified by loading and unloading processes in the antenna coil 3 and the antenna coil of the base station 4 and by other effects familiar to the man skilled in the art. In FIGS. 6 to 9 are shown waveforms of the antenna signal ASB that occur in practice in the antenna coil of the base station, the time interval Z1 being shown in an enlarged form in FIGS. 6 to 9.

Figure 6:
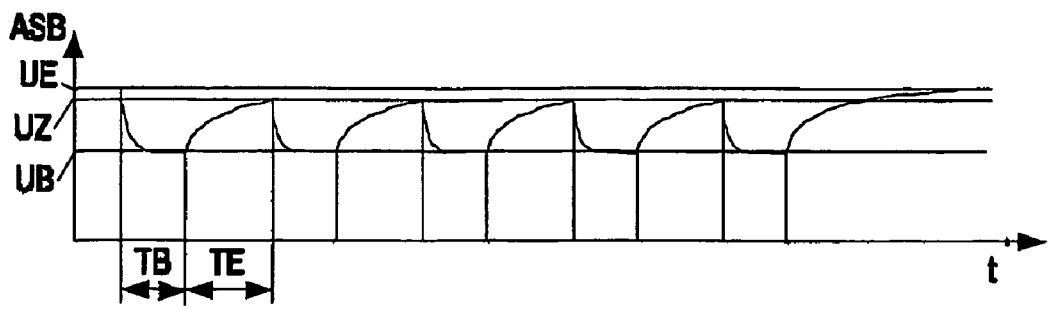
FIG. 6 shows the actual waveform over time of the antenna signal that is received from the electromagnetic field by the base station, when a prior-art data carrier is positioned within the reception zone of the base station, but relatively far away from the latter, and transmits transmission data.

The waveform of the antenna signal ASB that is shown in FIG. 6 shows a fast unloading process during the load period TB and a slow loading process during the off-load period TE. What is meant by unloading process in this case is the decay of oscillation in the antenna oscillator circuit and what is meant by a loading process is the rise to settled oscillation of the antenna oscillator circuit of the data carrier 1. If the electromagnetic field HF is not loaded by any data carrier situated within communication range of the base station 4, then an off-load voltage UE is set up. If such a data carrier then loads the electromagnetic field HF, the antenna signal ASB falls relatively quickly to the load voltage UB during the first load period TB. From the beginning of the off-load period TE, when the data carrier is no longer loading the electromagnetic field HF, the antenna signal ASB rises relatively slowly and, by the time the electromagnetic field HF is again loaded by the data carrier during the next load period TB, has reached only an intermediate voltage UZ. Only after the last load period TB in a series of successive load periods TB and off-load periods TE does the antenna signal again rise to the off-load voltage UE.

Figure 7:
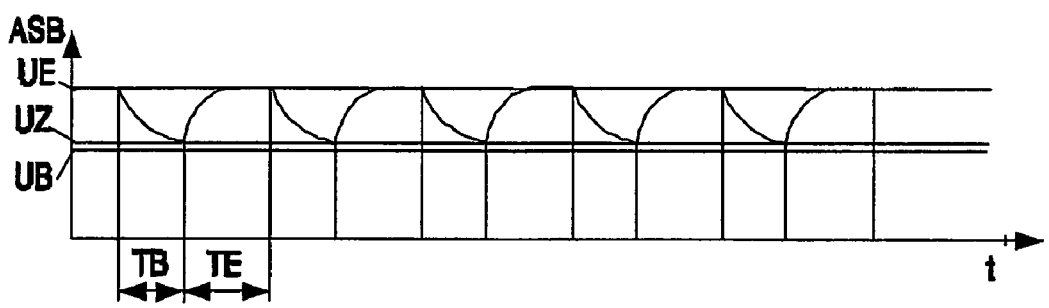
FIG. 7 shows the actual waveform over time of the antenna signal that is received from the electromagnetic field by the base station, when the prior-art data carrier is positioned within the reception zone of the base station, but relatively close to the latter, and transmits transmission data.

The waveform of the antenna signal ASB that has been described above and is shown in FIG. 6 occurs when a prior-art data carrier is positioned within communication range of the base station 4 but relatively far away from the base station 4. In FIG. 7 the opposite case in shown, where the prior-art data carrier is positioned relatively close to the base station 4. In FIG. 7 the antenna signal ASB falls relatively slowly during the load period TB only to the intermediate voltage UZ and during the off-load period TE it rises relatively quickly to the off-load voltage UE. In the base station 4, it is difficult for such different antenna signals ASB, from prior-art data carriers that are positioned relatively close to, and relatively far from, the base station 4, to be decoded, for which reason there is a relatively high error rate in the transmission data UDD.

The data carrier 1 according to the invention therefore has detection means 16 that are designed to detect an item of energy information EI that characterizes the energy content of the antenna signal ASD. Regulator means 8 as described above form the detection means 16 and the item of regulator-current information IRI emitted by the regulator means 8 characterizes the energy content of the antenna signal ASD. The data carrier 1 has in addition antenna voltage means 17 that determine the antenna voltage US applied to the coil terminals 5 and 6. The antenna voltage US likewise characterizes the energy content of the antenna signal ASD and a corresponding item of energy information EI can be transmitted by the antenna voltage means 17 to comparator means 18 of the data carrier 1.

The comparator means 18 then compare the item of regulator-current information IRI with one or more items of threshold regulator-current information stored in the data carrier 1 and/or compare the antenna voltage US with one or more items of threshold antenna-voltage information stored in the data carrier 1. The result or results of the comparison give the distance at which the data carrier 1 is situated from the base station 4, whereupon an item of comparison information VI giving this information is transmitted to modification means 19 in the data carrier 1.

The modification means 16 are then designed to modify the ratio of the duration of the load period TB to the duration of the succeeding off-load period TE as a function of the item of comparison information VI. An item of ratio information RI that gives the optimum ratio of the load period TB to the off-load period TE as a function of the distance at which the data carrier 1 is situated from the base station 4 can be transmitted by the modification means 19 to the modulator 15. The sum of the duration of the load period TB and the succeeding off-load period TE is always equal in this case to the length of one cycle of the subcarrier signal HTS.

Figure 8:
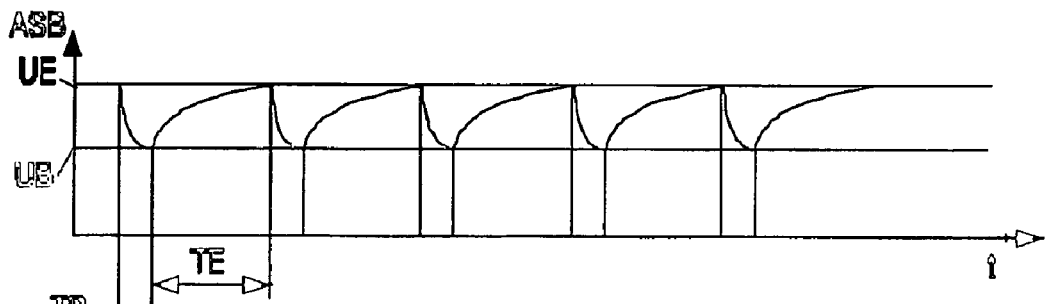
FIG. 8 shows the actual waveform over time of the antenna signal that is received from the electromagnetic field by the base station, when the data carrier according to the invention as shown in FIG. 1 is positioned within the reception zone of the base station, but relatively far away from the latter, and transmits transmission data.

FIG. 8 then shows the waveform of the antenna signal ASB when it is the data carrier 1 according to the invention that modulates the electromagnetic field HF. Even though, in this case too, the data carrier 1 is again positioned relatively far away from the base station 4 in the communication zone (fast fall and slow rise of the antenna signal ASB), the antenna signal ASB that is received in the base station 4 reaches the load voltage UB during every load period TB, and the off-load voltage UE during every off-load period TE. As a result, a demodulator at the base station 4 is able to demodulate the antenna signal ASB shown in FIG. 8 particularly well, and for this reason there is a relatively low error rate when transmission data UDD is transmitted.

Figure 9:
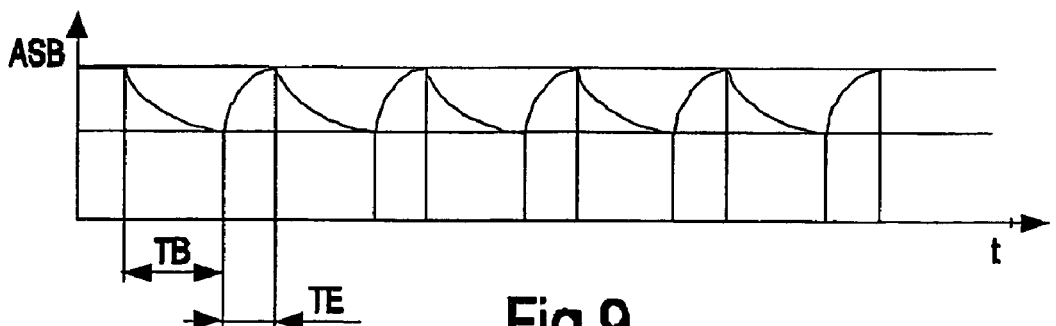
FIG. 9 shows the actual waveform over time of the antenna signal that is received from the electromagnetic field by the base station, when the data carrier according to the invention as shown in FIG. 1 is positioned within the reception zone of the base station, but relatively close to the latter, and transmits transmission data.

In FIG. 9 is shown the waveform of the antenna signal ASB when the data carrier according to the invention is positioned relatively close to the base station 4. In this case, the load periods TB preset by the modification means 19 are considerably longer than in FIG. 8 and for this reason the load voltage UB is reached during every load period TB and the off-load voltage UE is reached during every off-load period TE, even when the data carrier 1 according to the invention is so positioned in the communication zone. The demodulator at the base station 4 is therefore able to demodulate the antenna signal ASB particularly well in this case too.

It is particularly advantageous if the comparator means 18 and the modification means 19 are so designed that the ratio of the duration of the load period TB to the duration of the off-load period TE is steplessly variable. In this way, the ratio of the periods TB and TE will be optimally adjusted to any distance at which the data carrier 1 may be situated from the base station 4.

It may be mentioned that, if load modulation without subcarrier modulation is used, it is also possible for the ratio of the durations of the high periods and low periods of the encoded transmission data KUDD or of the transmission data UDD to be modified as a function of the comparison information and thus as a function of the distance at which the data carrier is situated from the base station. The ratio of the high and low periods would, once again, be modified in such a way that the duration of a complete cycle (high period+low period) remained constant for a "1" or "0" bit or for an encoded "1" or "0" bit. In this way a constant data rate and other advantages according to the invention that were mentioned above are obtained.

It may be mentioned that detection means of a data carrier according to the invention may also be formed only by the regulator means 8 or only by antenna voltage means 17 or only by comparable means.

It may be mentioned that a data carrier according to the invention does not have to have any clock-signal generating means because the clock signal for the data carrier could also be generated by an oscillator belonging to the processor means.

It may be mentioned that a data carrier according to the invention does not have to include a demodulator because a data carrier that is not asked to transmit by the base station (tag talks first) can send transmission data to the base station as soon as the supply voltage means had obtained sufficient energy from the electromagnetic field.

It may be mentioned that in the present connection the term antenna coil should also be understood to mean what is termed a dipole antenna, which is formed by two short stubs of wire.

It may be mentioned that the modulation load does not have to be connected directly to the antenna terminals but may for example be arranged in the data carrier downstream of the supply voltage means 7 at the position occupied by the regulator means 8.

It may be mentioned that the distance between the data carrier and the base station could also be determined by the base station and communicated to the data carrier.

It may be mentioned that the impedance of the modulation means could be purely inductive, capacitive or resistive or a mixture of these.

It may be mentioned that the modification of the ratio of the duration of the load period to the duration of the off-load period may be performed by lengthening or shortening the load period and/or the off-load period.

It may be mentioned that the energy content of the antenna signal is affected by the distance at which the data carrier is situated from the base station but also by the degree of coupling of the antenna oscillator circuit of the data carrier to the antenna oscillator circuit of the base station. The disclosure is therefore to be understood to the effect that, whenever a short distance from the data carrier to the base station is described, what is also meant is high coupling between the oscillator circuits. In the opposite case, when a long distance between the data carrier and the base station is described, what is also always meant is low coupling between the antenna oscillator circuits.

The invention claimed is:

1. A data carrier for contactless communication with a base station by means of an electromagnetic field generated by the base station, having an antenna coil connected to a first coil terminal and to a second coil terminal, in which antenna coil an antenna signal can be induced in operation by the electromagnetic field, and having modulation means for modulating the electromagnetic field, during successive load periods and off-load periods, with transmission data to be communicated to the base station, the electromagnetic field being load-modulated during the load periods by modifying a value of an impedance of a modulation load that is connected at least indirectly to the first coil terminal and the second coil terminal, and having detection means for detecting an item of energy information that characterizes the energy content of the antenna signal, and having comparator means for comparing the detected item of energy information that characterizes the energy content of the antenna signal with a preset item of energy information and for emitting an item of comparison information that gives a distance at which the data carrier is situated from the base station and having modification means for modifying a ratio of the duration of a load period to the duration of a succeeding off-load period as a function of the item of comparison information that gives the distance at which the data carrier is situated from the base station;

wherein the modulation means are designed to modulate the electromagnetic field with a subcarrier signal, the sum of the duration of the load period and the duration of the succeeding off-load period corresponding to the length of one cycle of the subcarrier signal and wherein the ratio of the duration of the load period to the duration of the succeeding off-load period is modified such that the sum of the duration of the load period and the duration of the off-load period is kept constant and equal to the length of one cycle of the subcarrier signal.

2. A data carrier as claimed in claim 1, wherein the modification means are designed to increase the ratio of the duration of the load period to the duration of the succeeding off-load period if the item of comparison information characterizes an item of energy information that has been detected that exceeds the preset item of energy information.

3. A data carrier as claimed in claim 1, wherein the modification means are designed for the stepless modification of the ratio of the duration of the load period to the duration of the succeeding off-load period.

4. A data carrier as claimed in claim 1, wherein, to detect the energy content of the antenna signal, the detection means are designed to determine the coil voltage arising between the first and second coil terminals.

5. A data carrier as claimed in claim 1, wherein, to detect the energy content of the antenna signal, the detecting means are designed to determine a bleed current through a regulator stage.

6. An integrated circuit of a data carrier for contactless communication with a base station by means of an electromagnetic field generated by the base station, having a first coil terminal and a second coil terminal, to which an antenna coil can be connected, in which antenna coil an antenna signal can be induced in operation by the electromagnetic field, and having modulation means for modulating the electromagnetic field, during successive load periods and off-load periods, with transmission data to be communicated to the base station, the electromagnetic field being load-modulated during the load periods by modifying a value of a impedance of a modulation load that is connected at least indirectly to the first coil terminal and the second coil terminal, and having detection means for detecting an item of energy information that characterizes the energy content of the antenna signal, and having comparator means for comparing the detected item of energy information that characterizes the energy content of the antenna signal with a preset item of energy information and for emitting an item of comparison information that gives a distance at which the data carrier is situated from the base station, and having modification means for modifying a ratio of the duration of a load period to the duration of a succeeding off-load period as a function of the item of comparison information that gives the distance at which the data carrier is situated from the base station;

wherein the modulation means are designed to modulate the electromagnetic field with a subcarrier signal, the sum of the duration of the load period and the duration of the succeeding off-load period corresponding to the length of one cycle of the subcarrier signal and wherein the ratio of the duration of the load period to the duration of the succeeding off-load period is modified such that the sum of the duration of the load period and the duration of the off-load period is kept constant and equal to the length of one cycle of the subcarrier signal.

7. An integrated circuit as claimed in claim 6, wherein the modification means are designed to increase the ratio of the duration of the load period to the duration of the succeeding off-load period if the item of comparison information indicates an item of energy information that has been detected that exceeds the preset item of energy information.

8. An integrated circuit as claimed in claim 6, wherein the modification means are designed for the stepless modification of the ratio of the duration of the load period to the duration of the succeeding off-load period.

9. An integrated circuit as claimed in claim 6, wherein, to detect the energy content of the antenna signal, the detection means are designed to determine the coil voltage arising between the first and second coil terminals.

10. An integrated circuit as claimed in claim 6, wherein, to detect the energy content of the antenna signal, the detecting means are designed to determine the bleed current through a regulator stage.

11. A data carrier as claimed in claim 1, wherein the modification means outputs an item of ratio information, which indicates the ratio of the load period to the off-load period, to the modulator means.

* * * * *